United States Patent
Cheng

(10) Patent No.: US 8,068,853 B2
(45) Date of Patent: Nov. 29, 2011

(54) SYSTEM AND METHOD FOR AUTOMATICALLY RECORDING POSITION INFORMATION

(75) Inventor: Chien-Hung Cheng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 431 days.

(21) Appl. No.: 12/406,092

(22) Filed: Mar. 17, 2009

(65) Prior Publication Data

US 2010/0173646 A1    Jul. 8, 2010

(30) Foreign Application Priority Data

Jan. 6, 2009  (CN) .......................... 2009 1 0300090

(51) Int. Cl.
*H04W 24/00*     (2009.01)
(52) U.S. Cl. ............... 455/456.1; 455/404.2; 455/456.2; 455/456.3; 455/456.5; 455/456.6; 455/457; 370/310.2; 370/328; 370/338
(58) Field of Classification Search ............... 455/404.2, 455/456.1, 456.2, 456.3, 456.4, 456.5, 456.6, 455/457; 370/310.2, 328, 338
See application file for complete search history.

(56) References Cited

U.S. PATENT DOCUMENTS

| | | | |
|---|---|---|---|
| 5,384,826 A * | 1/1995 | Amitay | 455/436 |
| 6,868,074 B1 * | 3/2005 | Hanson | 370/328 |
| 7,254,614 B2 * | 8/2007 | Mulligan et al. | 709/207 |
| 7,346,168 B2 * | 3/2008 | Chou et al. | 380/270 |
| 7,912,641 B2 * | 3/2011 | Osentoski et al. | 701/213 |
| 2005/0108322 A1 * | 5/2005 | Kline et al. | 709/203 |

FOREIGN PATENT DOCUMENTS

WO    WO 02/31515    * 4/2002

* cited by examiner

*Primary Examiner* — Steve D Agosta
(74) *Attorney, Agent, or Firm* — Altis Law Group, Inc.

(57) ABSTRACT

A method and system for automatically recording position information of an electronic device are provided. The method includes receiving a header notification from the electronic device; receiving a WAP query message comprising query information and position information of the electronic device; forwarding the WAP query message to a content server; and transmitting the position information of the electronic device to a corresponding GPS database so as to continuously record position information of the electronic device.

11 Claims, 2 Drawing Sheets

SYSTEM AND METHOD FOR AUTOMATICALLY RECORDING POSITION INFORMATION

BACKGROUND

1. Field of the Invention

Embodiments of the present disclosure relate to position information, and more particularly to a method and a system for automatically recording position information on a portable electronic device.

2. Description of Related Art

Navigational systems, such as the Global Positioning System (GPS) are gaining popularity with the public. Generally, GPS works by utilizing a cluster of satellites to determine a receiver's location. For example, each satellite in the cluster broadcasts a signal with identification, time and location information. A receiver receives this information from the cluster of satellites to determine the receiver's position.

By utilizing the GPS, a user is capable of obtaining exact position of the user and the efficient path to a destination. However, such function is generally activated by the user. As a result, the position of the user cannot be obtained while the user is unable to activate the corresponding GPS functions, such as in a kidnapping event.

Accordingly, a method and a system for automatically recording position information of a portable electronic device are called for in order to overcome the limitations described.

DETAILED DESCRIPTION OF CERTAIN INVENTIVE EMBODIMENTS

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
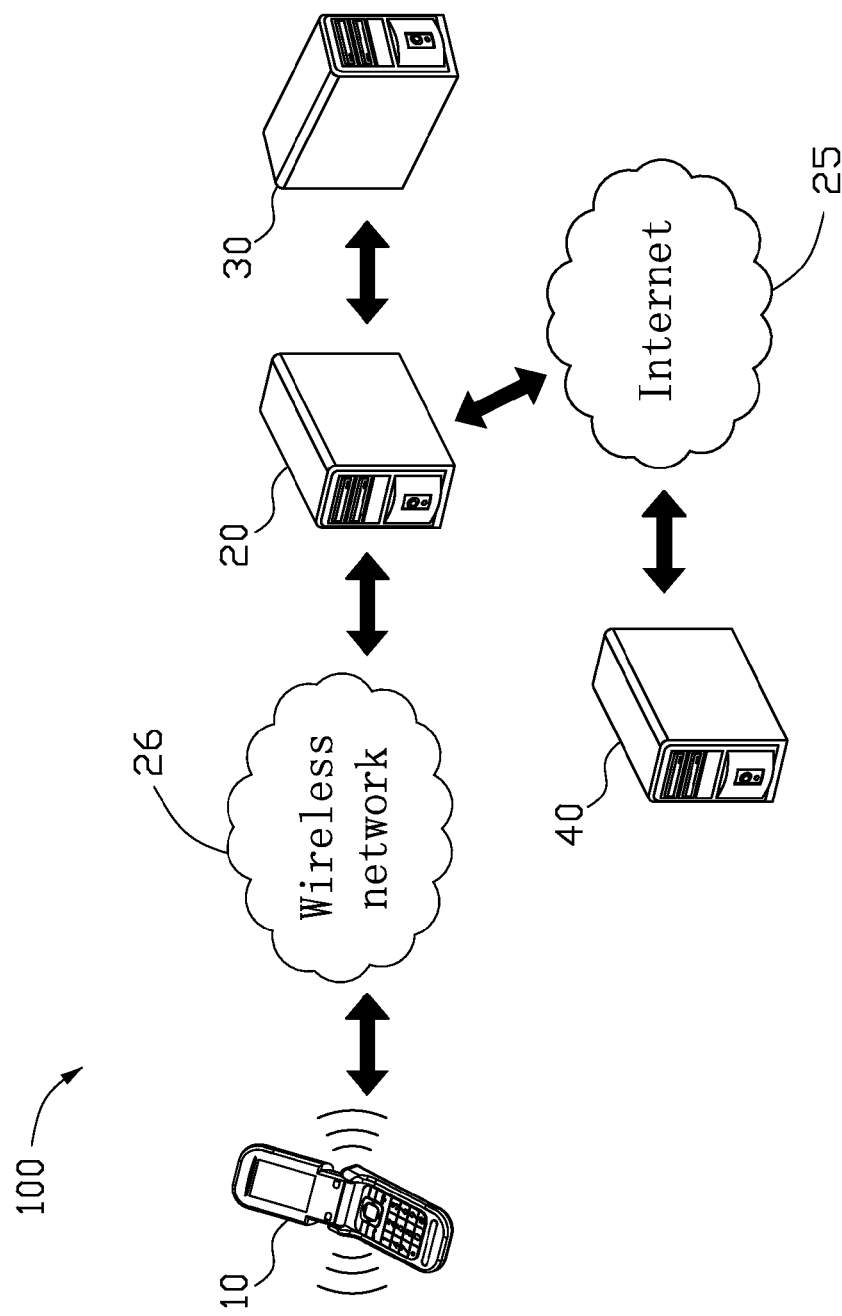
FIG. 1 is a system view of an embodiment of a system for automatically recording position information of a portable electronic device.

FIG. 1 is a system view of an embodiment of a system 100 for automatically recording position information (hereinafter "the system 100") of a portable electronic device 10. The system 100 includes the portable electronic device 10, a Wireless Application Protocol (WAP) gateway 20, and a Global Positioning System (GPS) database 30 connected to the WAP gateway 20 by a network, such as the Internet or an intranet. The GPS database 30 is configured for storing a plurality of GPS addresses of the portable electronic device 10. In the illustrated embodiment, the portable electronic device 10 is a mobile phone, although other electronic devices, such as notebook computers, and personal digital assistants (PDAs), for example, are equally applicable while fully maintaining the scope of the disclosure.

In one embodiment, the system 100 includes a content server 40 for providing WAP services to the portable electronic device 10. The portable electronic device 10 connects to the WAP gateway 20 by a Push Over-the-Air (Push OTA) Protocol located over a Wireless Session Protocol (WSP). The WAP gateway 20 is an entry point between the Internet 25 and a wireless network 26. The WAP gateway 20 connects to the Internet 25 by the Push Access Protocol (PAP), and then connects to the content server 40.

By utilizing WAP services, a WAP query message regarding query information is sent from the portable electronic device 10 to the content server 40 for acquiring information, such as stock information.

In one embodiment, before utilizing WAP services, the portable electronic device 10 firstly sends a header notification to the WAP gateway 20. The header notification indicates that the following WAP query messages sent from the portable electronic device 10 includes, in addition to the query information, position information of the portable electronic device 10. The position information includes the GPS address of the portable electronic device 10 and the IP address of the corresponding GPS database 30. Thus, two headers are added to the WAP query messages for respectively storing the GPS address of the portable electronic device 10 and the IP address of the corresponding GPS database 30.

Upon receipt of the header notification, the WAP gateway 20 adds at least two headers to WSP headers such that the WAP gateway 20 is capable of recognizing the position information of the WAP query message.

Upon receipt of the WAP query message from the portable electronic device 10, the WAP gateway 20 forwards the WAP query message to the content server 40 by a Hyper Text Transfer Protocol (HTTP) GET request.

In addition to forwarding the WAP query message to the content server 40, the WAP gateway 20 also transmits the GPS address of the portable electronic device 10 to the GPS database 30 according to the IP address indicated in the WAP query message. In this way, the GPS database 30 is capable of continuously recording the GPS address of the portable electronic device 10.

Upon receipt of the WAP query message, the content server 40 transmits the corresponding contents of the WAP query message to the push gateway 20 by an HTTP RESPONSE. The corresponding contents may be encoded in a Wireless Markup Language (WML) and is in a text format. The push gateway 20 then transmits the corresponding contents to the portable electronic device 10 by the Push OTA protocol after the corresponding contents are received.

In addition, the WAP gateway 20 further provides a query interface for querying relevant GPS addresses of the portable electronic device 10 within a specific period. Upon executing an query, the WAP gateway 20 connects to the GPS database 30 to query the relevant GPS addresses of the portable electronic device 10. It is to be noted that the relevant GPS addresses may be encoded in the WML. Upon receiving the relevant GPS addresses, the WAP gateway 20 further transmits the relevant GPS addresses to the portable electronic device 10 by the Push OTA Protocol.

Understandably, in alternative embodiments, the functions performed by the WAP gateway 20 and GPS database 30 may be incorporated to be performed by a single server.

Figure 2:
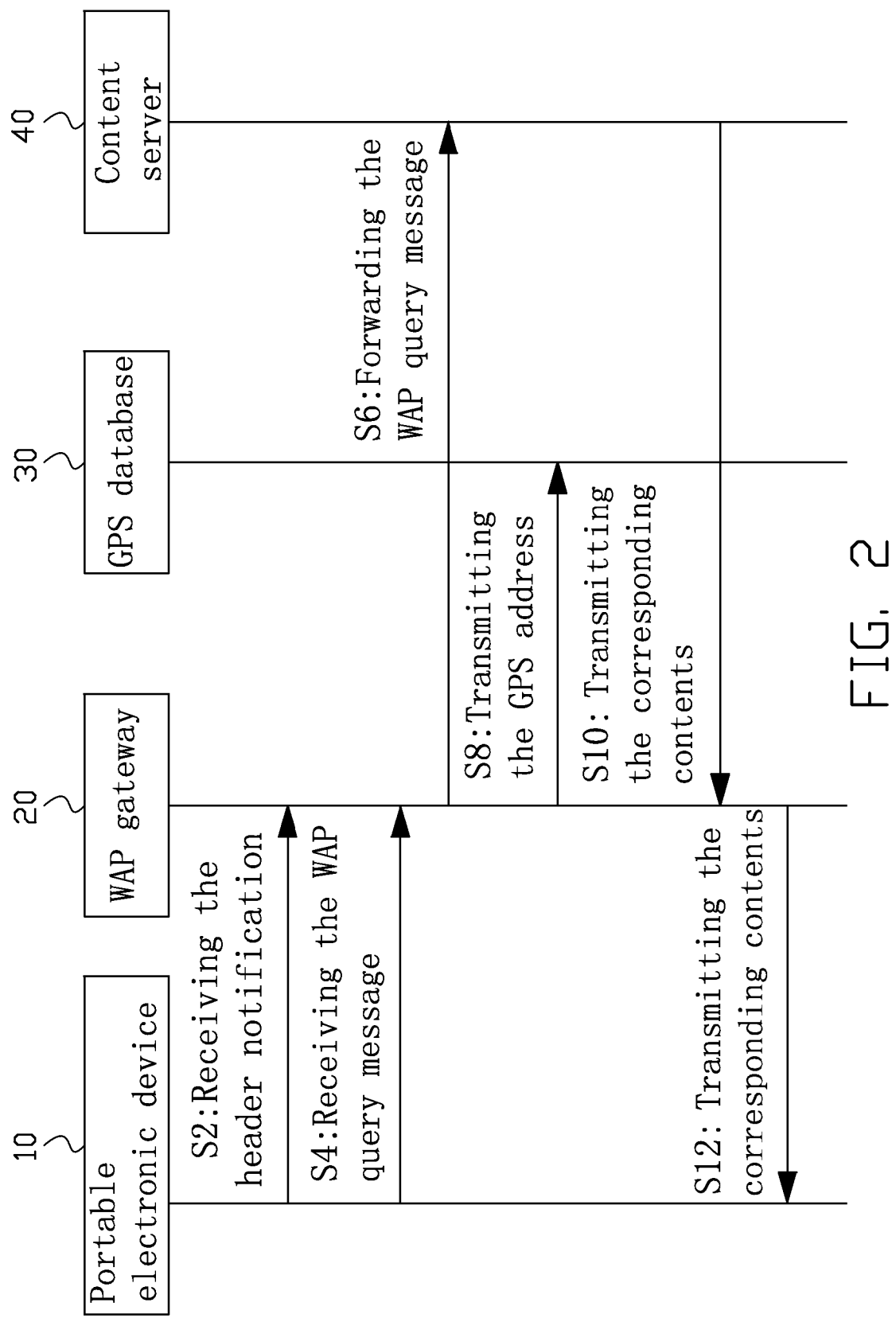
FIG. 2 is a flowchart of an embodiment of a method for automatically recording position information of a portable electronic device.

FIG. 2 is a flowchart of an embodiment of a method for automatically recording position information. The method of FIG. 2 may used for automatically recording position information of the portable electronic device 10 when the portable electronic device 10 utilizes the WAP services. Depending on the embodiment, additional blocks may be added or deleted and the blocks may be executed in order other than that described.

In block S2, the WAP gateway 20 receives a header notification. The header notification indicates that the WAP query messages include the query information (e.g., stock information) together with the position information of the portable electronic device 10. The position information includes the GPS address of the portable electronic device 10 and the IP address of the GPS database 30. Upon receipt of the header notification, the WAP gateway 20 adds at least two headers to WSP headers such that the WAP gateway 20 is capable of recognizing the position information of the WAP query message.

In block S4, the WAP gateway 20 receives the WAP query message from the portable electronic device 10.

In block S6, the WAP gateway 20 forwards the WAP query message to the content server 40. In block S8, the WAP gateway 20 transmits the GPS address of the portable electronic device 10 to the GPS database 30.

In block S10, the content server 40 transmits the corresponding contents to the WAP gateway 20 by the HTTP RESPONSE. In block S12, the WAP gateway 20 transmits the corresponding contents to the portable electronic device 10. In this way, the GPS address of the portable electronic device 10 is sent together with the query information by the WAP query message. Thus, the WAP gateway 20 is capable of directing the GPS address to the corresponding GPS database for continuously recording the IP address of the portable electronic device 10.

It is important to note that while the disclosure has been described in the context of a fully functioning data processing system, those of ordinary skill in the art will appreciate that the processes of the disclosure are capable of being distributed in the form of a computer readable medium of instructions and a variety of forms and that the disclosure applies equally regardless of the particular type of signal bearing media actually used to carry out the distribution. Examples of computer readable media include recordable-type media such as floppy disc, a hard disk drive, random access memory (RAM), and compact disc-read only memory (CD-ROM), as well as transmission-type media, such as digital and analog communications links.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for automatically recording position information of an electronic device, the system comprising:
a Wireless Application Protocol (WAP) gateway configured for receiving WAP query messages from the electronic device, the WAP query messages including query information and position information of the electronic device, wherein the WAP gateway sends the position information of the electronic device to a Global Positioning System (GPS) database upon receipt of the WAP query messages so as to continuously record position information of the electronic device, the WAP gateway connects to the electronic device by a push over-the-air protocol, forwards the WAP query message to a content database by a push access protocol located over a wireless session protocol (WSP), and adds at least two headers to wireless session protocol (WSP) headers for respectively storing a GPS address of the electronic device and an IP address of the GPS database.

2. The system as claimed in claim 1, wherein the position information comprises the GPS address of the electronic device and the IP address of the GPS database, the WAP gateway further configured for sending the GPS address of the electronic device to the GPS database according to the IP address of the GPS database.

3. The system as claimed in claim 2, wherein the WAP gateway further provides a query interface for querying relevant GPS addresses of the electronic device within a specific period.

4. A computer-implemented method being executed by a processor of an electronic computer for automatically recording position information of the electronic device, the method comprising:
receiving a header notification from the electronic device by a push access protocol;
receiving a Wireless Application Protocol (WAP) query message comprising query information and position information of the electronic device;
forwarding the WAP query message to a content server by the push access protocol located over a wireless session protocol (WSP);
transmitting the position information of the electronic device to a corresponding Global Positioning System (GPS) database upon receipt of the WAP query messages so as to continuously record position information of the electronic device; and
adding at least two headers to wireless session protocol (WSP) headers for respectively storing an GPS address of the electronic device and an IP address of the corresponding GPS database.

5. The method as claimed in claim 4, wherein the position information includes the GPS address of the electronic device and the IP address of the corresponding GPS database.

6. The method as claimed in claim 4, wherein the transmitting step further comprises:
transmitting the GPS address of the electronic device to the corresponding GPS database according to the IP address of the corresponding GPS database.

7. The method as claimed in claim 4, further comprising:
querying relevant GPS addresses of the electronic device within a specific period.

8. A tangible and non-transitory computer-readable medium for automatically recording position information of an electronic device, the computer-readable medium having stored thereon instructions that, when executed by an electronic device, cause the electronic device to:
receive a header notification from the electronic device by a push access protocol;
receive a Wireless Application Protocol (WAP) query message comprising query information and position information of the electronic device;
forward the WAP query message to a content server by the push access protocol located over a wireless session protocol (WSP);
transmit the position information of the electronic device to a corresponding Global Positioning System (GPS) database upon receipt of the WAP query messages so as to continuously record position information of the electronic device; and
add at least two headers to WSP headers for respectively storing a GPS address of the electronic device and an IP address of the corresponding GPS database.

9. The computer-readable medium as claimed in claim 8, wherein the position information includes the GPS address of the electronic device and the IP address of the corresponding GPS database.

10. The computer-readable medium as claimed in claim 8, wherein the instructions, when executed by the electronic device, further cause the electronic device to:

transmit the GPS address of the electronic device to the corresponding GPS database according to the IP address of the corresponding GPS database.

11. The computer-readable medium as claimed in claim 8, wherein the instructions, when executed by the electronic device, further cause the electronic device to:

query relevant GPS addresses of the electronic device within a specific period.

* * * * *